Aug. 6, 1957     F. J. SIMON     2,802,073

AUTO SAFETY BELT

Filed Jan. 10, 1956

INVENTOR.

Ferdinand J. Simon

United States Patent Office 2,802,073
Patented Aug. 6, 1957

---

2,802,073

AUTO SAFETY BELT

Ferdinand J. Simon, Lutcher, La.

Application January 10, 1956, Serial No. 558,237

3 Claims. (Cl. 200—61.08)

This invention relates to automobile seat safety belts.

It is an object of the present invention to provide an auto seat safety belt which will prevent the motor from being started until the safety belt is fastened.

It is another object of the present invention to provide an auto seat safety belt of the above type which will automatically shut off the motor of the vehicle in case of an accident.

Other objects of the invention are to provide an auto seat safety belt bearing the above objects in mind which is of simple construction, has a minimum number of parts, is inexpensive to manufacture and effective in use.

For other objects and a better understanding of the invention, reference may be had to the following detailed description taken in connection with the accompanying drawing, in which.

Figure 1:
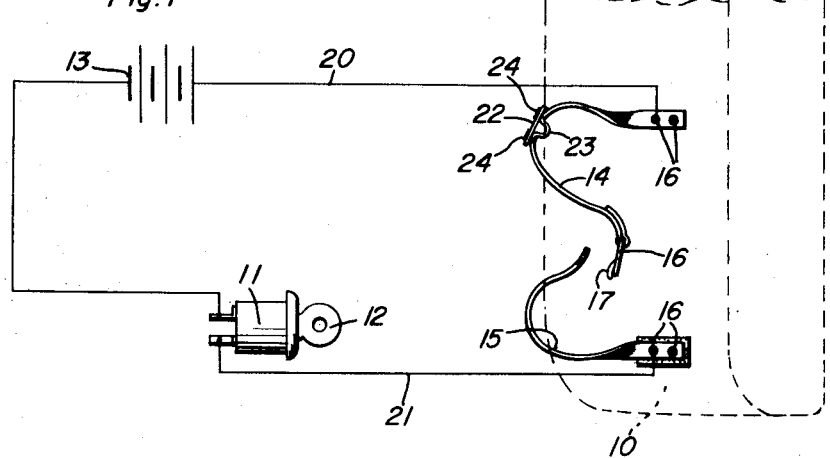
Figure 1 is a top plan view partly diagrammatic of a preferred embodiment of the present invention.
Figure 2:
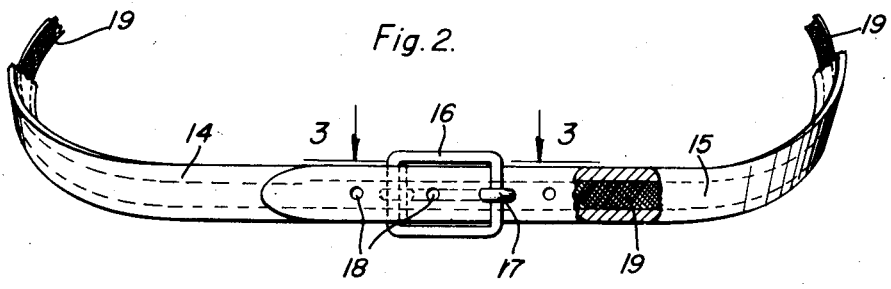
Fig. 2 is a fragmentary front perspective view of the invention shown partly in section.
Figure 3:
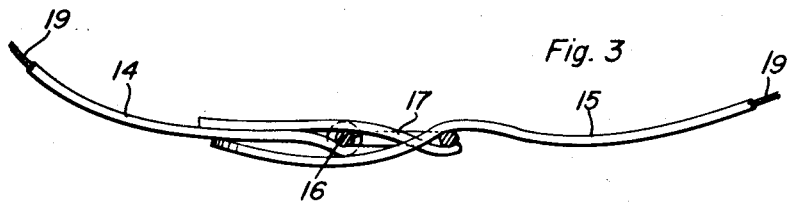
Fig. 3 is a horizontal sectional view thereof taken along the line 3—3 of Fig. 2.
Figure 4:
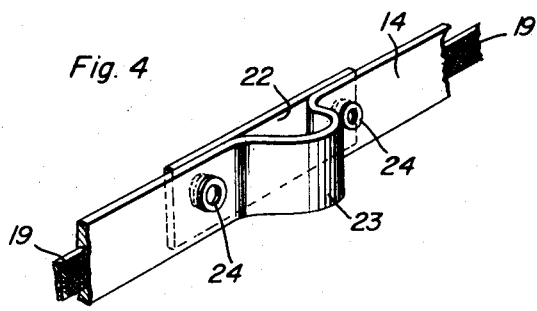
Fig. 4 is a fragmentary perspective view shown partly broken away of another portion of the device.

Referring now to the drawing more in detail, 10 indicates the front seat of an auto having the usual ignition 11 controlled by the key 12 and connected in series with the battery 13, substantially as illustrated.

In the practice of my invention, the belt straps 14 and 15 of flexible fabric or other suitable material are secured in laterally spaced relationship to the seat 10 in suitable manner, for example by means of the screws 16. A buckle 16' is mounted on the other end of the belt element 14 and includes the usual prong 17, the buckle and prong being formed of electrically conductive material. The belt member 15 is provided with the longitudinally spaced openings 18 therethrough which cooperate with the belt buckle in the usual manner whereby to secure the elements about the waist of the motorist. Conductor cables 19 are woven or molded into each of the belt elements 14 and 15 and are connected in series with the ignition 11 and battery 13 by means of the conductors 20 and 21. The cable 19 of the belt element 15 is provided with openings aligned with the openings 18 and is adapted to be contacted by the prong 17 whereby to close the circuit when the belt is fastened across the waist of the motorist, as will be obvious.

By means of this arrangement, it will be readily apparent that the ignition 11 cannot be closed by the key 12 to start the car unless the belt elements are fastened together to establish the electrical connection between the cable 19 and thus, to close the circuit. In entering the auto, the driver may forget to fasten the seat belt, but with this arrangement, the engine cannot be started to operate until the set belt is fastened because it is connected through the ignition switch.

The cable 19 within the element 14 is broken and has the adjacent ends thereof connected by the conductor strip 22 which is secured across the fold 23 of the belt 14 by means of the snap fastening constructions 24. The male and female elements of the snap fasteners 24 are connected to the conductor strip 22 and the cable ends 19, being formed of electrically conductive material. In the event that the strip 22 is snapped out of engagement with belt 14, the circuit will again be opened. In the event of an accident, the impact of the motorist moving forward against the belt element 14 will snap the conductor strip 22 out of place to automatically open the circuit and shut off the engine to prevent fires. The strip 22 will be of such strength as to break when an accident occurs and is renewable by the snap fasteners 24.

While various changes may be made in the detail construction, it shall be understood that such changes shall be within the spirit and scope of the present invention as defined by the appended claims.

What I claim as new and desire to protect by Letters Patent of the United States is:

1. An auto seat safety belt comprising flexible belt elements secured in laterally spaced arrangement to the auto seat and adapted to encircle the waist of the wearer, conductor strips within said belt elements, said strips being connected in series with the ignition of the car, conductive buckle means for connecting the ends of said belt elements and establishing electrical contact between said cables and to close the circuit, whereby to prevent the car from being started until the belt is fastened, and means for connecting the cable of said conductor strips upon impact of the car with another car or obstacle whereby to automatically open the ignition switch and to prevent fire in case of accident, said last mentioned means comprising one of the conductor strips of said belt elements being broken across a folded portion of the belt element, a conductor strip adapted to connect the broken ends of said first conductor strip, said second conductor strip being of such strength as to break upon impact during an accident, and releasable means for fastening said second conductor strip to the belt element whereby to permit its renewal when broken.

2. An auto seat safety belt according to claim 1, said fastening means comprising complementary snap fastening elements carried by said belt element and the ends of said second conductor strip, the male and female elements of said snap fasteners being in electrical contact with said first and second conductor strips.

3. An auto seat safety belt according to claim 2, said buckle means comprising a buckle secured to the free end of one of said belt elements, said buckle including a prong and being formed of conductive material, the other of said belt elements having longitudinally spaced openings extending through its respective conductor strip whereby to establish electrical contact between the conductor strips and both belt elements when buckled together.

References Cited in the file of this patent

UNITED STATES PATENTS

| 747,370 | Brislin | Dec. 22, 1903 |
| 2,510,115 | Jakosky | June 6, 1950 |
| 2,644,051 | Maloof | June 30, 1953 |